Aug. 19, 1947.   N. R. KRAUSE   2,425,943
ADJUSTABLY MOUNTED BEARING
Original Filed May 6, 1940
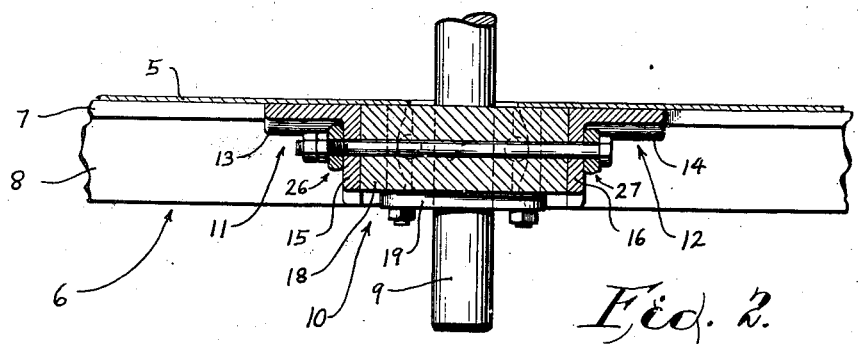
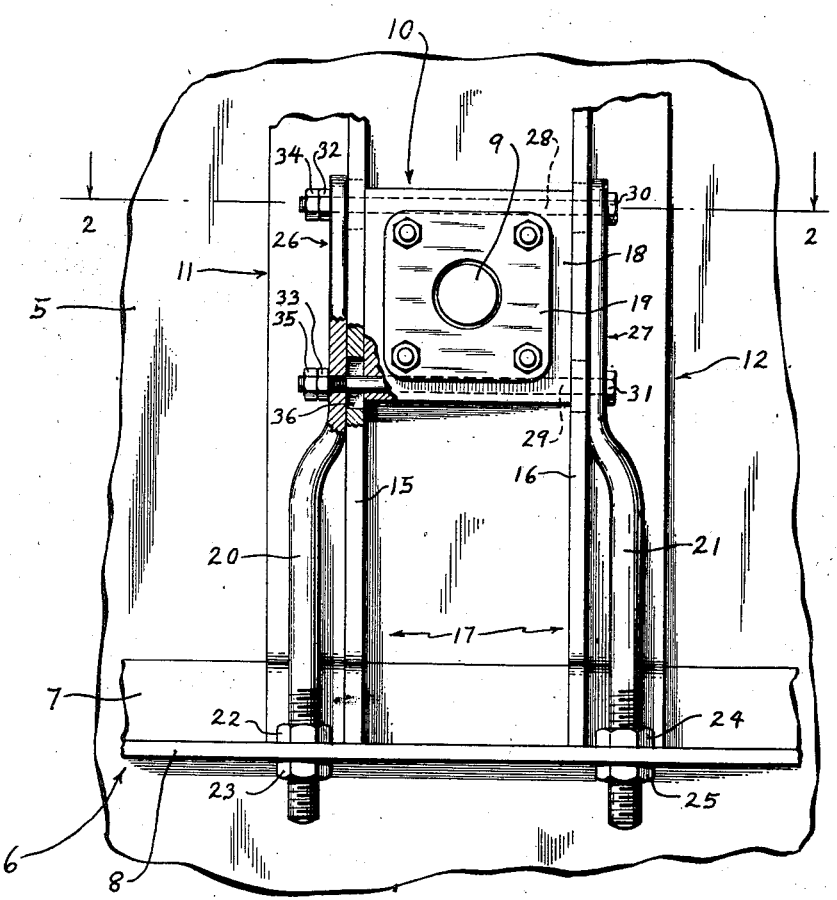
INVENTOR
Norman R Krause
BY
Emerson B Donnell
ATTORNEY.

Patented Aug. 19, 1947

2,425,943

UNITED STATES PATENT OFFICE 2,425,943

ADJUSTABLY MOUNTED BEARING

Norman R. Krause, Racine, Wis., assignor to J. I. Case Company, Racine, Wis., a corporation Original application May 6, 1940, Serial No. 333,489, now Patent No. 2,336,263, dated December 7, 1943. Divided and this application October 30, 1943, Serial No. 508,293

5 Claims. (Cl. 308—59)

The present invention relates to threshing mechanism and an object thereof is to generally improve the construction and operation of machines of this class.

A further object is to provide improved mounting for the cylinder shaft in such a mechanism, the present application being a division of the application of Norman R. Krause, Serial No. 333,489, filed May 6, 1940, now Patent No. 2,336,-263, for Combination harvester threshers.

Further objects and advantages will become apparent from the following specification and accompanying drawings in which Figure 1 is a side elevation of so much of a thresher mechanism as necessary to illustrate the invention.

Fig. 2 is a horizontal sectional view of the same taken on the line 2—2 of Fig. 1.

As seen in Fig. 1, 5 represents a wall portion of a thresher or harvester thresher which is united with and at least in part supported by a sill or longitudinal structural element generally designated as 6, in the present instance comprising an angle iron having an upright flange 7 and a horizontal flange 8. A cylinder shaft or axle 9 is required to be substantially supported and accordingly the means for mounting the same is included as part of the general framing of the thresher or combine. Shaft 9 is carried in bearings, only one of which is necessary to be described and generally designated as 10, the details of the cylinder forming no part of the present invention, the shaft only being disclosed.

Upright braces or members generally designated as 11 and 12, conveniently comprising angle irons having flanges 13 and 14 respectively, lying against wall 5 and projecting flanges 15 and 16, are suitably fixed as by welding, riveting or the like with sill 6 and extend upwardly along wall 5. Flanges 15 and 16 extending outwardly as they do, provide a channel 17 between them. A block 18 is placed in channel 17 and carries a bearing generally designated as 19 which may be of any suitable type forming no part of the present invention, block 18 and bearing 19 constituting a bearing unit which may be adjusted as will appear. Jack bolts 20 and 21 extend through above mentioned flange 8 of sill 6 and may be locked therein as by nuts 22 to 25 inclusive. Bolts 20 and 21 are preferably, although not necessarily, flattened at 26 and 27 respectively and other bolts 28 and 29 extend through the flattened portions and through outwardly directed flanges 15 and 16 and also through block 18, bolts 28 and 29 including heads 30 and 31 respectively and being arranged for clamping flattened portions 26 and 27, flanges 15 and 16 and block 18 rigidly together as by means of nuts 32 and 33 which in turn may be secured as by lock nuts 34 and 35 respectively. In this manner block 18 and bearing 19 are carried in an extremely stable and substantially rigid manner directly from sill 8.

It is desirable to locate cylinder shaft 9 quite accurately with relation to internal parts of the threshing mechanism, not shown, and forming no part of the present invention. Slots as 36 are therefore formed in flanges 15 and 16 for the accommodation of bolts 28 and 29 whereas said bolts are relatively closely fitted in flattened portions 26 and 27 of jack bolts 20 and 21 and also in block 18. By adjusting nuts 22 and 24 while clamping nuts 32 and 33, and also nuts 23 and 25 are loosened, block 18 may accordingly be very accurately raised or lowered in channel 17 to obtain the desired adjustment of shaft 9. If block 18 resists downward movement, it may be readily forced by tightening nuts 23 and 25. When such adjustment is secured, nuts 32 and 33 may be tightened and also such of nuts 22 to 25 as are loose at the moment, whereupon flanges 15 and 16 and bolts 20 and 21 will be rigidly clamped together and the block and bearing very strongly supported by braces 11 and 12 and bolts 20 and 21. Bolts 20 and 21 therefore act as adjusting means as well as anchoring means for block 18 and bearing 19.

To facilitate the above outlined adjustment, it is desirable but not imperative that bearing unit 19 be of a type permitting substantial misalignment, many of which are well-known.

The operation of the invention is thought to be clear from the foregoing description which sets forth an illustrative embodiment of the invention and what is claimed as new and desired to be secured by Letters Patent of the United States is:

1. In a thresher, a housing having a longitudinal structure element, a shaft for supporting a threshing cylinder in said housing and a bearing supporting the shaft, spaced upright members carried by said longitudinal structural element, said bearing being carried between said upright members, slots in said upright members and a bore in said bearing aligned with said slots, jack bolts extending in the general direction of said spaced members and having bores aligned with the bore in said bearing, a bolt traversing said aligned bores and slots and arranged for clamping said jack bolts, said upright members and said bearing in rigid relation, and means for adjustably anchoring said jack bolts to said longitudinal structural element.

2. In a thresher, a housing having a longitudinal structural element, and adapted to carry a threshing cylinder therein, a shaft for supporting a threshing cylinder and a bearing unit supporting the shaft, a substantially vertically extending brace connected with said longitudinal structural element and having a projecting flange, said bearing unit providing vertically spaced bores and said flange providing vertically spaced slots, clamping bolts in said bores and projecting through said slots, a jack bolt disposed on the opposite side of said flange from said bearing unit engaged with said longitudinal structural element and having vertically spaced bores aligned with the bores in said bearing unit, said clamping bolts being engaged in said vertically spaced bores, and means for adjustably anchoring said jack bolt to said longitudinal structural element for supporting said bearing and adjusting it in position relatively to said longitudinal structural element.

3. In a thresher, a housing having a longitudinal structural element and adapted to carry a threshing cylinder therein, a shaft for supporting a threshing cylinder and a bearing unit supporting the shaft, spaced upright members carried by one of said longitudinal structural elements, said bearing being carried between said upright members, slots in said upright members and bores in said bearing aligned with the slots, jack bolts engaged with said longitudinal structural element extending in the general direction of said spaced members and having bores aligned with the bores in said bearing unit, bolts traversing said aligned bores and slots and arranged for clamping said jack bolts, said upright members and said bearing unit in rigid relation, and means for adjustably anchoring said jack bolts to said longitudinal structural element.

4. In a thresher, a housing having a side wall including a longitudinal structural element, and adapted to carry a threshing cylinder therein, a shaft for supporting a threshing cylinder in said housing and a bearing unit supporting the shaft, a substantially vertically extending brace forming a part of said side wall connected with said longitudinal structural element and having a projecting flange, said bearing unit providing vertically spaced bores, clamping bolts in said bores, a jack bolt disposed on the opposite side of said flange from said bearing unit and engaged with said longitudinal structural element, said clamping bolts being fixedly engaged in said jack bolt and movably traversing said flange, and means for adjustably anchoring said jack bolt to said longitudinal structural element for supporting said bearing and adjusting it in position relatively to said longitudinal structural element.

5. In a thresher, a housing including a side wall having a longitudinal structural element, a thresher cylinder shaft extending into said housing, and a bearing unit positioned in supporting relation to said shaft, said wall having spaced upright members carried by said longitudinal structural element, said bearing being disposed between said upright members, slots in said upright members and bores in said bearing aligned with the slots, jack bolts engaged with said longitudinal structural element, spaced outwardly from and extending in the general direction of said spaced members, said bolts bending inwardly into contact with said upright members and having bores aligned with the bores in said bearing unit, clamping bolts traversing said aligned bores and slots so as to act when tightened to clamp said jack bolts, said upright members and said bearing unit in rigid relation to each other and at a fixed position in said side wall, and means on said jack bolts for rigidly anchoring them to said longitudinal structural element for adjusting said jack bolts up or down so as to accurately adjust, through said clamping bolts, the position of said bearing when said clamping bolts are loosened, said spaced upright members, said clamping bolts, said jack bolts, said longitudinal structural element and said anchoring means being normally clamped together in rigid relation and together operating to support said bearing in adjusted position.

NORMAN R. KRAUSE.

REFERENCES CITED

The following references are of record in the file of this patent:

UNITED STATES PATENTS

| Number | Name | Date |
|---|---|---|
| 1,232,085 | Rebold | July 3, 1917 |
| Re. 18,486 | Hurxthal | May 31, 1932 |